T. D. MILLEA.
COUPLING FOR FLOAT VALVES.
APPLICATION FILED NOV. 5, 1907.

1,009,031.

Patented Nov. 14, 1911.
2 SHEETS—SHEET 1.

WITNESSES
A. C. Fairbanks.
J. M. Sterns

INVENTOR
Thomas D. Millea,
BY
Webster & Co.
ATTORNEYS

T. D. MILLEA.
COUPLING FOR FLOAT VALVES.
APPLICATION FILED NOV. 5, 1907.

1,009,031.

Patented Nov. 14, 1911.

2 SHEETS—SHEET 2.

WITNESSES
A. C. Fairbanks.
J. M. Sterns

INVENTOR
Thomas D. Millea,
BY
Webster & Co.
ATTORNEYS

UNITED STATES PATENT OFFICE.

THOMAS D. MILLEA, OF SPRINGFIELD, MASSACHUSETTS, ASSIGNOR TO THE UNIVERSAL TOOL COMPANY, OF SPRINGFIELD, MASSACHUSETTS, A CORPORATION OF MASSACHUSETTS.

COUPLING FOR FLOAT-VALVES.

1,009,031.      Specification of Letters Patent.      Patented Nov. 14, 1911.

Original application filed September 13, 1906, Serial No. 334,404. Divided and this application filed November 5, 1907. Serial No. 400,733.

*To all whom it may concern:*

Be it known that I, THOMAS D. MILLEA, a citizen of the United States of America, residing at Springfield, in the county of Hampden and State of Massachusetts, have invented a new and useful Coupling for Float-Valves, of which the following is a specification, the same being a divisional part of an application for United States Letters Patent filed by me September 13, 1906, and bearing Serial No. 334,404.

My invention relates to improvements in float valves and more especially to couplings adapted to connect float valves and the like with supply or other pipes, and consists essentially and primarily of a two-seated member of peculiar construction, as hereinafter set forth; and the objects of my invention are, first, to provide a universal coupling member and coupling particularly adapted to ball-cocks or float valves whereby such valves can be connected readily with any size and kind of supply pipe connection; second, to afford convenient and efficient means for making connections between float valves and supply pipes expeditiously and economically and without calling for the exercise of any particular skill in the making of such connections, the greatest difficulty attending the installation of float valves and the removal for repair or other purposes of the same being thus obviated, and, third, to provide a shank for the support of a valve-seat, which shank has at its outer end a double-seated screw-threaded part or universal coupling member that may be varied to adapt it to fit different makes and sizes of ball-cock connections having either ground-joints or packing-ring seats.

I attain the objects and secure the advantages above noted, together with others which will appear hereinafter, by the means illustrated in the accompanying drawings, in which—

Figure 1:
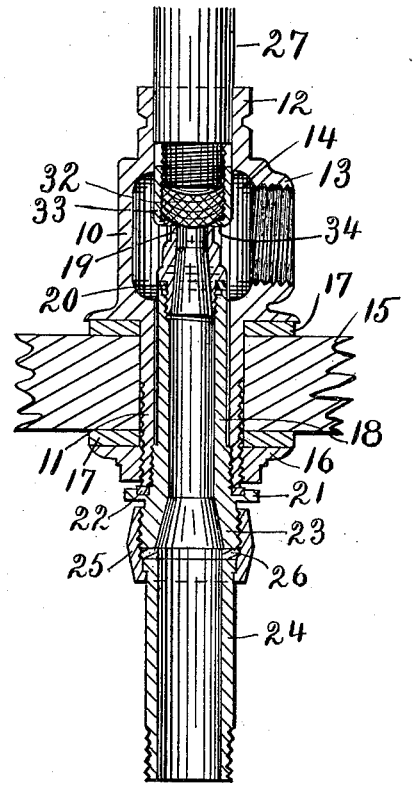
Figures 2, 3:
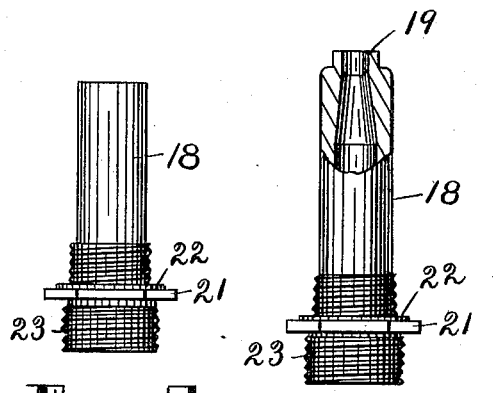
Figure 4:
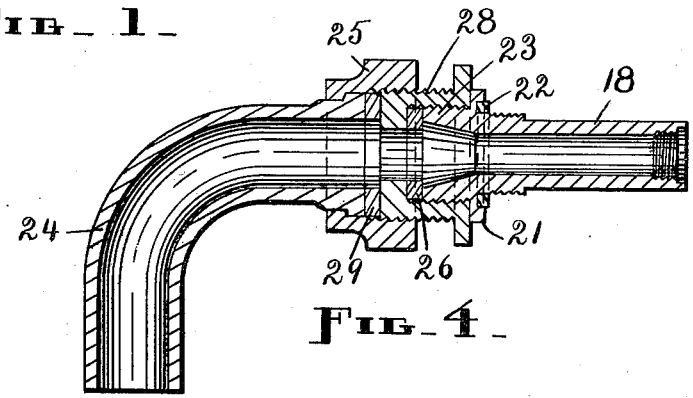
Figure 5:
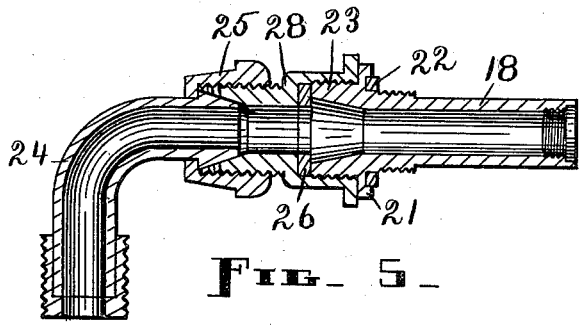

Figure 1 is a longitudinal section through a float valve casing and connections embodying one form of my invention; Fig. 2, a side elevation of the coupling member shown in the preceding view; Fig. 3, a side elevation in partial section of a coupling member having an integral valve-seat; Fig. 4, a sectional view of a reducing coupling; Fig. 5, a sectional view of an enlarging coupling, and Figs. 6 and 7, sectional views illustrating other forms of the coupling, the valve casing and all connections being shown in both cases.

Similar figures refer to similar parts throughout the several views.

In the drawings 10 represents a valve casing provided with end extensions 11 and 12 and a side extension 13, all of which extensions have passages therethrough to open into the chamber 14 in said casing. The extension 11 is both internally and externally screw-threaded. This extension is passed through the floor 15 of a tank and securely held in place by a nut 16 beneath said floor, washers 17—17 being employed in the usual manner. Although the casing 10 is here illustrated in a vertical position, it is to be understood that it may be placed horizontally without necessitating any change in the coupling construction.

In the first view the supply enters the chamber 14 through the passage in a shank 18 and a valve-seat 19 at the inner end of said shank, and the outlet from such chamber is through the passage in the extension 13. The hollow shank 18 is internally screw-threaded at the inner terminal to receive the screw-threaded terminal with which the valve-seat 19 is provided, a packing-ring 20 being interposed between this end of said shank and a suitable flange on said seat, and external screw-threads are provided on that portion of the shank which enters the extension 11 to engage the interior extension screw-threads. Outside of the threaded portion of this shank when in place is a prismatic flange 21, a packing-ring 22 being interposed between this flange and the adjacent end of the extension 11, and below or beyond said flange is an externally screw-threaded part which with so much of the shank 18 as is threaded to engage the extension 11 is termed the bushing 23. The outer portion of the bore of the shank 18 is tapered so that a ground-joint can be formed with the shank as well as a packing-ring connection.

It will now be observed that the so-called bushing 23 is not only double threaded but also double seated, that is, there is a seat for the packing-ring 22 and another at the outer end which might be called a compound seat since it is adapted for either a packing-ring or a ground-joint connection, as will be more fully explained in the course of this description; it will be observed, furthermore, that by providing a number of shanks 18 with bushings of different sizes at their outer ends and different kinds of threads on such ends, or by providing the different bushings only in the manner presently to be described, for a valve, such valve is rendered adaptable for different sizes and kinds of connections; from which it is clear that I have produced a simple but efficient and valuable coupling for connecting a ball-cock with any form of supply pipe or supply pipe connection.

In the absence of any connection with the supply, that is, when the outer end of the bushing 23 is free, the shank 18 can be unscrewed from the extension 11 and it with the valve-seat 19 removed from the casing, or said valve-seat can be unscrewed and taken out with a suitable implement through the extension 12 when the passage therethrough, which is the valve-stem passage, is clear, and the act of replacing one or both of these members or of substituting another or others is performed in either of the two ways mentioned. This double method of removing and replacing the valve-seat and the peculiar construction and arrangement of the shank and valve-seat constitute very valuable features of my invention, since it is possible to easily and expeditiously make all necessary changes, such changes being demanded for different water pressures, different supply connections, etc.

In Fig. 3 the valve-seat is not separable from the shank 18, hence can be removed only with the latter through the extension 11.

In Fig. 1 an ordinary coupling 24 is held to the bushing 23 of the shank 18 by an ordinary coupling nut 25, the usual packing-ring 26 being inserted between adjacent ends of said bushing and coupling. Instead of a packing-ring connection a ground-joint can be made with the shank 18 by using a coupling similar to 24 in Figs. 5 and 6, it being necessary of course for the nut 25 to fit the bushing 23 or, to state it more correctly perhaps, for the bushing to fit the nut. Ordinarily the device is fitted to any connection by selecting a shank having a bushing of the proper kind and size at its outer end, as heretofore stated, but in the absence of a shank equipped with the right kind of bushing recourse may be had to one of the additional universal coupling members shown in Figs. 4 and 5 which will now be described.

The additional universal coupling element is a nut or a bushing practically like the bushing 23 since it is provided with two seats and two screw-threaded portions and can accomplish the same results. One threaded portion of the aforesaid nut or bushing must fit the ball-cock union, the outer end of the shank bushing in this case, while the other threaded portion must fit the particular coupling nut of ordinary construction which is employed. The seat at the outer terminal of this universal coupling member, that is, the terminal opposite that which engages the bushing 23, may be compound, as in the case of said bushing 23, or otherwise. It is necessary to provide these additional members in quantities of the right sizes and having the right threads to fit the different kinds of connections into the make-up of which they are expected to enter.

The two examples shown in Figs. 4 and 5 illustrate the additional bushing and its application quite fully and show the only practical difference which exists between a reducing nut and an enlarging nut, such difference not amounting to a radical or vital structural change. In Fig. 4 the coupling nut 25 for the coupling 24 is too large for the bushing 23, hence an additional bushing 28 which fits said nut 25 as well as the bushing 23 is selected and used. A packing-ring 29 is inserted between the seat at the outer end of the bushing 28 and the adjacent end of the coupling 24, and a packing-ring 26 is inserted between the inner seat in said bushing 28 and the adjacent end of the bushing 23. The bushing 28 in this view will have a tapered part for a ground-joint, as it does in Fig. 5, when required, and such part may be omitted from the bushing 28 in Fig. 5 and only the packing-ring seat provided. In Fig. 5 the coupling nut 25 is too small for the bushing 23 hence a bushing 28 which fits this nut 25 is selected and introduced to make up the connection. All of the bushings 28 fit the bushings 23, as the different bushings 23 fit the extension 11. The internal inner seat in the bushing 28 in Fig. 5 receives a packing-ring 26 introduced between it and the adjacent end of the bushing 23, and the tapered seat at the outer end of said bushing 28, or the tapered part of the compound seat, receives the tapered terminal of the coupling 24.

Figure 6:
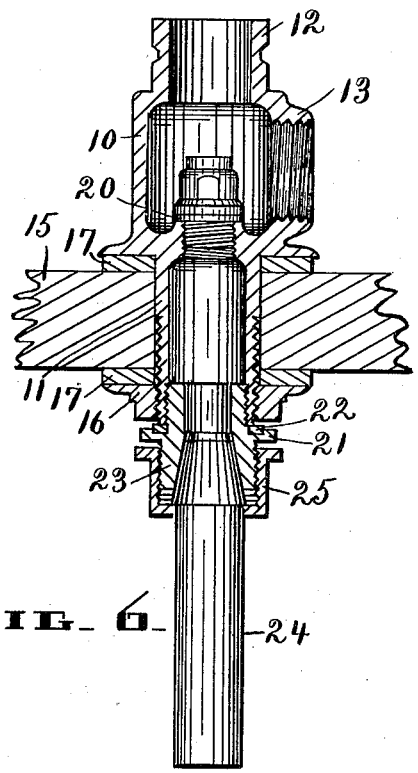
Figure 7:
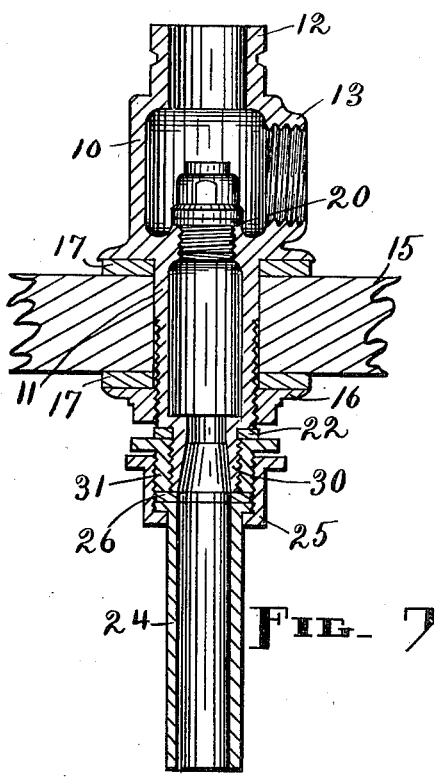

In Figs. 6 and 7 the shank is omitted and the valve-seat mounted in the casing at the inner end of the passage in the extension 11. A bushing 23 without the shank portion is employed and a ground-joint formed in Fig. 6, otherwise the universal connection does not differ from that shown in the first view.

In Fig. 7 the outer end of the extension 11 is lengthened and made smaller to form a nipple or union 30 to which the nut 25 of the coupling 24 is attached by means of a universal nut or bushing 31 which is double seated and double threaded substantially the same as the other universal bushings. The bushing 31 is screwed onto the union 30 with a packing-ring 22 between the top of said bushing and a shoulder surrounding said union, and the coupling nut 25 is screwed onto the bushing with a packing-ring 26 between the top of the coupling 24 and the bases of the bushing and union. A ground-joint connection is possible here as in the other cases.

Although the various forms of universal coupling members differ more or less one from another in minor details of construction, such differences being necessary in order to meet every possible contingency, they do not differ in their essential characteristics whether of construction or application.

The lower portion of a valve-stem 27 appears in Fig. 1 with a plurality of valve disks 32 held against the inner end of the stem by a thimble 33 having an internal flange 34 at the inner end and screwed on to the inner terminal of said valve-stem. More or less than the number of disks 32 shown may be used. This valve is adapted to open and close the entrance to the chamber 14 when the valve-stem is operated by the means and in the manner shown and described in the aforesaid application; said valve is shown resting on the valve-seat in its closed position in the drawing.

From the foregoing it will be easily understood that my invention is not only efficient and practicable, but readily adaptable without material change to many and varied usages, the range of application being very extensive.

Various changes in shape, size, and arrangement of some or all of the parts which enter into my coupling may be made without departing from the nature of my invention.

What I claim as my invention, and desire to secure by Letters Patent, is—

1. As a new article of manufacture, a coupling comprising a hollow body provided with an external flange and seat externally screw-threaded both sides of said flange, and further provided with a compound-seat at the terminal between which and the first seat is located said flange, such compound-seat comprising an internal tapered seat portion and a seat portion at the outer end of said first-mentioned seat portion.

2. The combination, with a valve-casing internally screw-threaded at its outer terminal, of a coupling comprising a hollow body externally flanged, externally screw-threaded both sides of said flange, and provided with a seat at the flange and with a compound-seat at the outer end, such compound-seat comprising an internal tapered seat portion and a seat portion at the outer end of said first-mentioned seat portion, and such coupling being adapted to be screwed into said outer casing-terminal with the flange seat contiguous to said terminal, an ordinary coupling, and a nut for said last-mentioned coupling adapted to be screwed on to the outer terminal of said first-mentioned coupling.

3. The combination, with an internally and externally screw-threaded member of a valve-casing, of a coupling externally flanged and screw-threaded, the flange being intermediate of the ends of said coupling and the screw-threaded portions of said coupling being both sides of said flange, and provided with a seat at the flange adjacent to the inner end and with a compound-seat at the opposite or outer end of the coupling, such compound-seat comprising an internal tapered seat portion and a seat portion at the outer end of said first-mentioned seat portion, and such coupling being adapted to screw into the aforesaid casing member with the flange seat forming a tight joint therewith, an ordinary coupling, and a nut for said last-mentioned coupling adapted to be screwed on to the outer terminal of said first-mentioned coupling and connect the two couplings with said compound-seat forming a tight joint between them.

4. As a new article of manufacture, a hollow shank adapted to be secured in the inlet passage of a valve-casing and provided at one terminal with a valve-seat and at the other terminal with a compound-seat, and further provided with an intermediate screw-threaded part and an intermediate seat-provided flange, said compound-seat comprising an internal tapered seat portion and a seat portion at the outer end of said first-mentioned seat portion.

THOMAS D. MILLEA.

Witnesses:
A. C. FAIRBANKS,
F. A. CUTTER.

Copies of this patent may be obtained for five cents each, by addressing the "Commissioner of Patents, Washington, D. C."